United States Patent [19]

Gargrave

[11] 4,214,793
[45] Jul. 29, 1980

[54] CONNECTOR AND BEARING DEVICES

[76] Inventor: Robert J. Gargrave, 4717 James Hill Rd., Dayton, Ohio 45425

[21] Appl. No.: 815,558

[22] Filed: Jul. 14, 1977

[51] Int. Cl.² ............... B60B 27/02; B60B 27/06; B25G 3/28
[52] U.S. Cl. ............... 301/111; 29/413; 83/698; 285/421; 308/244; 403/369; 403/409; 403/372
[58] Field of Search ............... 301/1, 111, 121, 122; 308/244, 236; 285/421; 403/369, 368, 374, 409, 366–367, 372; 29/413, 417; 83/698

[56] References Cited

U.S. PATENT DOCUMENTS

| | | | |
|---|---|---|---|
| 2,231,068 | 2/1941 | Harrington | 403/367 X |
| 2,680,633 | 6/1954 | Brown | 403/369 |
| 2,836,446 | 5/1958 | Hall, Sr. | 285/421 X |
| 3,058,386 | 10/1962 | Morrow | 403/369 X |

FOREIGN PATENT DOCUMENTS

| | | | |
|---|---|---|---|
| 176179 | 8/1961 | Sweden | 403/472 |
| 860615 | 2/1961 | United Kingdom | 403/372 |
| 1080302 | 8/1967 | United Kingdom | 301/111 |

Primary Examiner—Charles A. Marmor
Attorney, Agent, or Firm—Jerome P. Bloom

[57] ABSTRACT

A plate segment for insertion in a hole, cavity or recess to position and/or lock a shaft-like portion of an object within and/or with reference to its bounding wall structure has preferred embodiments comprising plate segments formed of sheet metal in a stamping operation including tooth-like projections. Depending upon the embodiment the tooth-like projections may extend from either or both faces of the plate segments and/or its lateral extremities. The tooth-like projections are formed to provide teeth portions of which are skewed to facilitate the application and anchoring of the segment. In a particularly preferred configuration the plate segment comprises a leading end, a trailing end and side edge portions, the roots of which side edge portions are generally parallel and bound a main body portion of the plate segment which is curved on a uniform radius, in a lateral sense, to provide that the respectively remote faces thereof are formed to resemble a longitudinal portion of a cylindrical surface.

25 Claims, 13 Drawing Figures

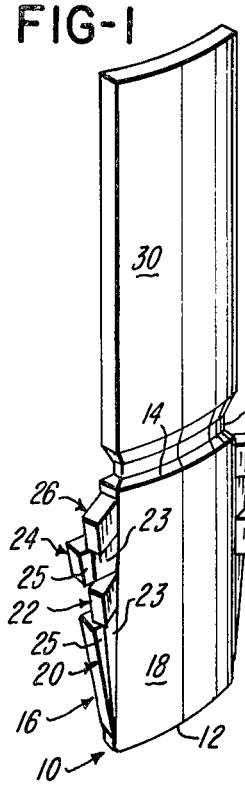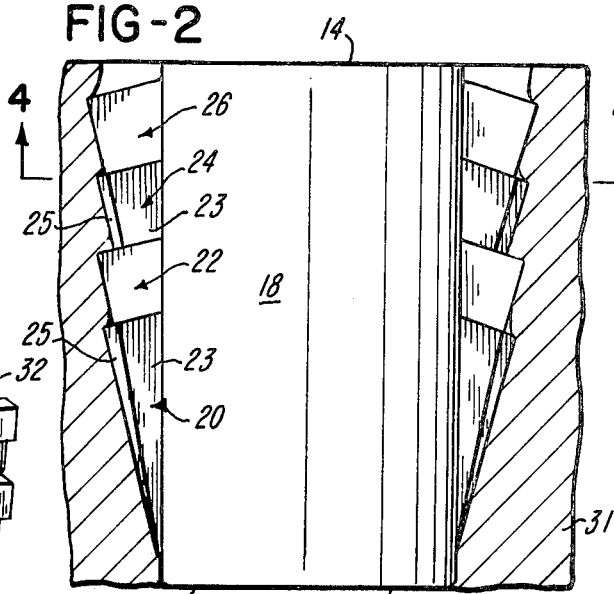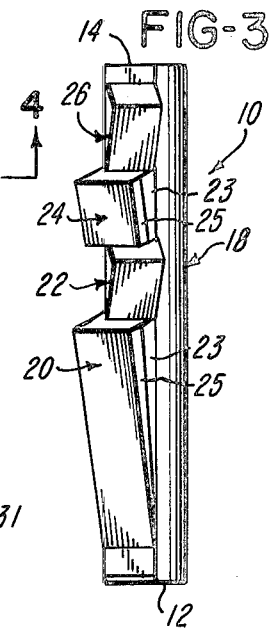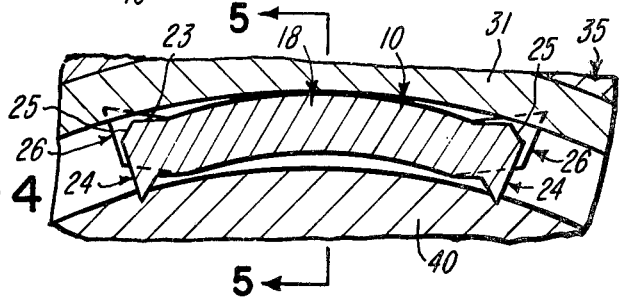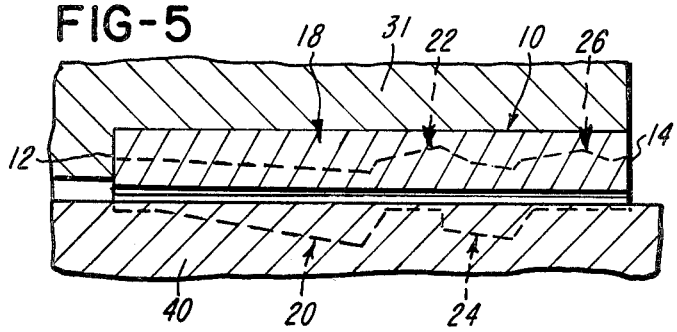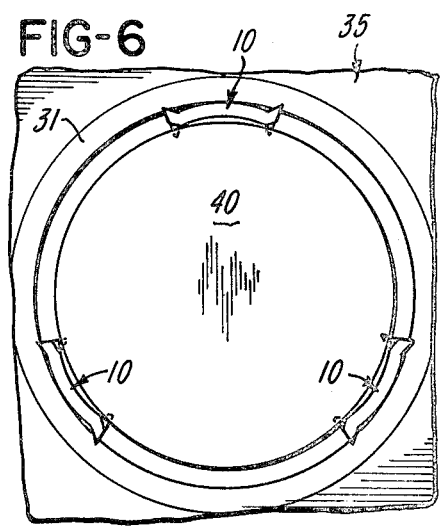

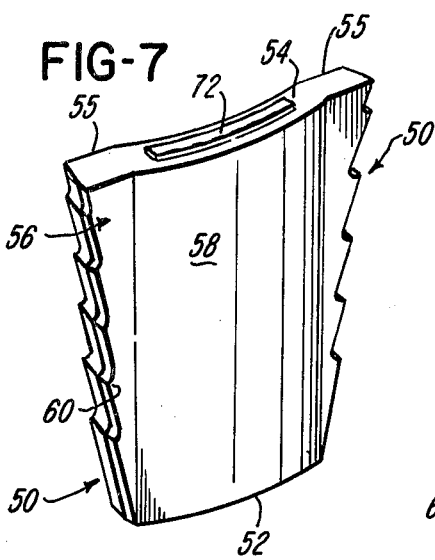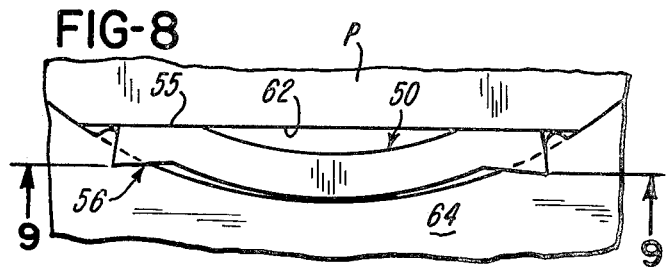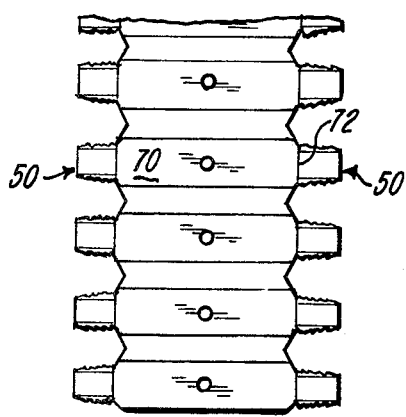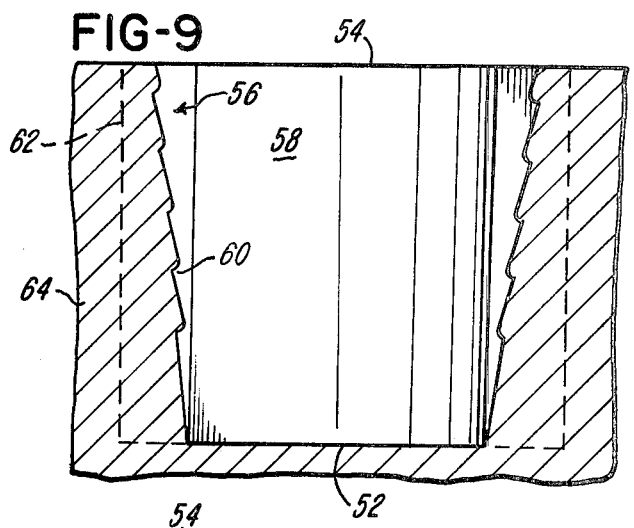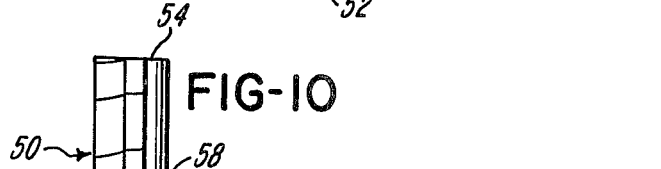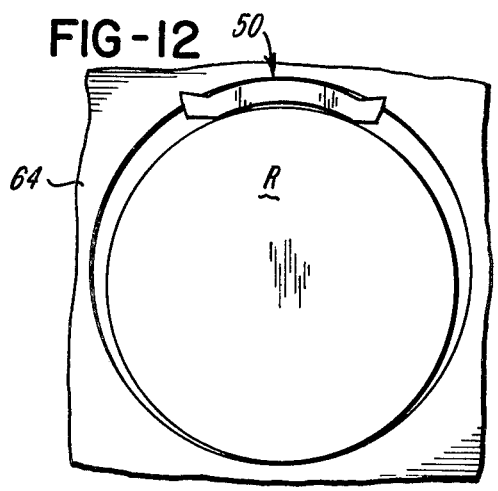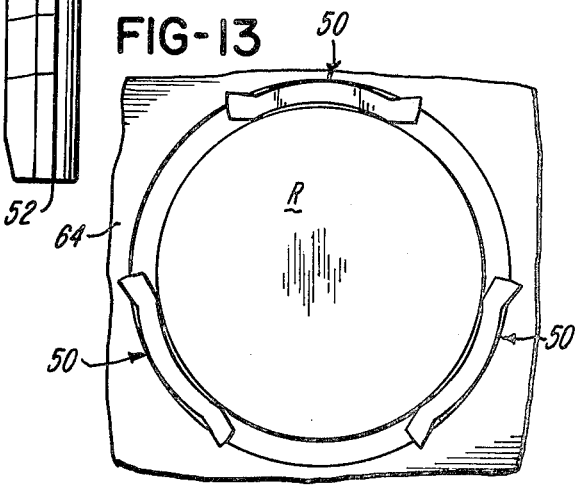

CONNECTOR AND BEARING DEVICES

BACKGROUND OF THE INVENTION

This invention relates to improvements in and simplification of the available structure for positioning a shaft-like portion of an element within a hole, cavity or recess. Depending on the form of its embodiment, it may provide a device which has a locking function or a locking and a bearing function.

The prior art has a multitude of keying and bearing devices, the former of which include pins, bars, shims and the like and the latter of which have various contrived compositions. In no case, however, does there appear to be any structure in the form of a simple and very inexpensive stamping which can serve either or both purposes. Nor does the prior art appear to provide a simple little stamping capable of taking a substantial load in use thereof and serving to maintain the position thereof as well as the position of related parts. As a matter of fact, the present inventor has no knowledge of any particular prior patent which he would construe as material to a consideration of the present invention.

The problems of the prior art the solution to which was the target of the efforts which resulted in the development of the present invention were many. One target was to reduce the need for multiplicity of devices to serve the functions herein described. Another target was to find a way to simplify the construction of and substantially reduce the cost of production of devices of the type described. Yet a further target was to find a way to salvage parts which were accidentally or inadvertently formed with oversized holes for accommodating other parts. That the targets of the invention have been achieved will become readily evident from the following description of the invention by way of illustration of some of its preferred embodiments.

SUMMARY OF THE INVENTION

The present invention provides an extremely simple and very inexpensive stamping which may be contrived to serve as a locking type connector element which may provide a bearing function as well.

One form of embodiment herein described comprises a plate-like segment formed in a stamping operation to include a leading edge, a trailing edge and identical side edge portions, the latter of which bound a main body portion having a bowed or arced configuration in a transverse sense. The side edge portions in this instance have lateral cuts to form of each thereof a series of teeth successively adjacent of which are oppositely bent and relatively skewed as to their orientation. The device provided by this plate segment has its effective lateral extremities tapered from its trailing edge to its leading edge. The device accordingly has the configuration of a truncated arrowhead and affords means for a press fit insertion between a shaft-like portion of an element and a bounding wall structure of a second element which defines a hole, cavity or recess in which the shaft-like portion is positioned. In the press fit of the plate segment the oppositely bent teeth formed in its side edge portions will anchor to the respectively opposite surfaces of the shaft-like portion and its bounding wall structure. Not only is a relative anchoring of the parts between which the segment is easily placed achieved but the parts are positioned one relative the other.

A second embodiment of the invention herein described is similarly stamped from sheet metal in a forming operation and provides a plate-like segment having with respect to its usual mode of application a leading edge, a trailing edge and identical side edge portions of generally triangular configuration. Intermediate the side edge portions the main body portion of the plate segment is configured similar to the main body portion of the embodiment above described. In this case the main body portion which is cylindrically arcuate in a transverse sense is bounded by relatively flat side edge portions which are co-planar and present flats bounding the concave surface of the main body portion. The outermost extremities of the side edge portions which define their outer side edges are formed to include therein a series of teeth which are spaced axially of the plate segment, one following the other. The teeth are symmetrically paired to either side of the main body portion and the remote surfaces of the paired teeth are tapered to converge towards the leading edge of the segment. Again the embodiment of the invention presents a plate segment having, in plan view, the shape of a truncated arrowhead. The teeth form barbs on the lateral edges of the arrowhead and their trailing ends are distinguished by a relatively skewed configuration as related to a line which is directly transverse to the surfaces of the plate segment here involved. This embodiment of the invention has a specially advantageous application for positioning between the head of a punch and its retainer to fix the position of the punch. In such case the punch will have a flat on a side surface thereof at its head to which the flats on the plate segment will be applied as the plate segment is press fit between the flat and the bounding wall surface of the hole in the punch retainer in which the punch is located. The plate segment will in such event not only serve a locking and retaining function but its flats will provide a positioning of the punch which will permit the punch withdrawal and replacement as and when desired with insurance that the replaced punch will have the same orientation as the punch in the first instance.

It is further contemplated that the last described embodiment of the invention may be formed so that the respective remote faces of the main body portion of the plate segment of the invention may have an arcuate configuration respectively conforming to a portion of a shaft contained in the hole and to the wall structure of the hole which is in bounding and surrounding relation to the shaft. In using a modification such as just described, one may apply it to position a shaft, for example, in an oversized hole and enable a bearing relation thereto of the shaft. The benefits of this in salvaging parts with oversized holes which are adapted to accommodate shafts are believed readily apparent.

It is accordingly a primary object of the invention to provide connector and bearing devices which are very economical to fabricate, efficient and satisfactory in use, adaptable to a wide variety of applications and unlikely to malfunction.

A further object of the invention is to provide means for salvaging parts with oversized holes.

Another object of the invention is to provide simple inserts for providing an accurate location of a shaft-like portion of an element within a hole, cavity or recess which anchor in a manner to inhibit their inadvertent loosening or withdrawal.

An additional object of the invention is to provide connector and bearing devices formed of sheet metal in a stamping operation and endowed with substantial strength and anchoring capabilities.

Another object of the invention is to provide bearing and connector devices which may be press fit in the application thereof and which possess the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein are shown some but not necessarily the only forms of embodiment of the invention, FIG. 1 is a perspective view of one embodiment of the present invention comprising a plate segment serving primarily as a connector and positioning device;

FIG. 2 is a generally diagrammatic illustration of the plate segment of FIG. 1 to illustrate the manner in which it is applied;

FIG. 3 is a side view of the plate segment of FIG. 1;

FIG. 4 is a view taken on line 4—4 of FIG. 2;

FIG. 5 is a sectional view taken on line 5—5 of FIG. 4;

FIG. 6 is a generally diagrammatic view illustrating the use of the plate segment of FIG. 1 in connecting a wheel to a shaft;

FIG. 7 is a perspective view of a further embodiment of the invention having connector features and providing retention and bearing means;

FIG. 8 is a fragmentary head end view illustrating the application of the device of FIG. 1 in positioning and fixing the head of a punch in its retainer;

FIG. 9 is a view taken on line 9—9 of FIG. 8;

FIG. 10 is a side view of the device of FIG. 7;

FIG. 11 illustrates a fabrication of the device of FIG. 7 in a strip assembly from which the devices may be separated in selective quantities;

FIG. 12 illustrates a modification of the device of FIG. 7 serving as a bearing or positioning device for a shaft projected through and bounded for rotation in an oversized hole; and FIG. 13 illustrates the modification of the invention shown in FIG. 12 used to center a shaft for rotation in an oversized hole.

Like parts are indicated by similar characters of reference throughout the several views.

As seen in FIG. 1 of the drawings, one embodiment of the present invention, comprising an element stamped from sheet metal in a forming operation, provides a plate-like segment 10 having, with reference to the usual mode of its application, a leading edge 12, a trailing edge 14 and identical side edge portions 16. The effective lateral extremities of the side edge portions 16 are tapered from the trailing edge 14 to the leading edge 12. The root lines or inner extremities of the side edge portions 16 are generally parallel and bound what may be considered the main body portion 18 of the segment 10, one end of which is included in the leading edge 12 and the other in the trailing edge 14. This gives the main body portion 18 a generally rectangular outline. As seen in FIG. 4, in a transverse sense the main body portion 18 is bowed to form an arc, the arc being created on a uniform radius. As so formed, one face or outer surface of the main body portion 18 has a convex configuration in a transverse sense and the other a concave configuration. As thus provided each of the remote faces of the main body portion has the configuration of a longitudinal segment of a cylindrical surface.

The side edge portions 16 are provided with a series of transversely extending longitudinally spaced cuts terminating at their root lines. These cuts form in each of the side edge portions 16 a plurality of teeth, respectively numbered 20, 22, 24 and 26, in a direction inwardly of the leading end of the plate segment 10. In the cutting and forming of the side edge portions 16, the teeth 20, 22, 24 and 26 are each bent outwardly from the main body portion 18 so as to project from the respectively remote faces of the plate segment successively in opposite directions. At the same time, the adjacent teeth of each of the side edge portions are skewed, one relative the other. Viewing the drawings, the teeth 22 and 26 are bent outwardly of the convex surface of the main body portion of the plate segment 10 while the teeth 20 and 24 of each side edge portion 16 are bent outwardly with respect to the concave outer surface of the main body portion 18. The teeth 20 and 24 are distinguished from the teeth 22 and 26 in that they include inner and outer portions 23 and 25 which are angled one relative the other. The inner portions of the teeth 20 and 24 which join to the root line of the side edge portions 16 of which they form a part are generally aligned and lie in a common plane with respect to which the main body portion is bowed in a transverse sense. The outer portions 25 of these teeth are bent to form with the inner portions 23 an obtuse angle so directed to give a hook-like configuration to the outer extremities of the teeth 20 and 24 as they project outwardly and commonly with respect to the concave side of the main body portion 18.

The arrangement of the teeth formed in and comprising the side edge portions 16 on the main body portion 18 of the plate segment 10 is to give the plate segment the general configuration of a truncated arrowhead, with the teeth 20, 22, 24 and 26 resembling skewed barbs bent outwardly from each of its remote faces.

In the preferred fabrication of a plate segment 10 as above described it will be stamped from sheet metal so as to have integral therewith an elongate handle portion forming an axial extension 30 of the main body portion 18 which is of similar configuration and joined thereto by a relatively thinned plate segment 32 which forms therebetween a break-away joint.

FIG. 4 of the drawings shows the application of the plate segment 10 between the hub 31 of a wheel 35 and a shaft-like portion 40 of its axle. In application of the plate segment 10 it will be axially directed between the outer surface of the shaft-like portion and the bounding inner wall surface of the hub 31 of the wheel. The leading end 12 of the plate segment will be first inserted and, as the segment is tapped between the shaft-like portion 40 and the hub 31, the teeth 22 and 26 will engage into the inner wall of the hub and produce a pressured flow of material which locks over and behind the teeth as they move axially of the inner surface of the hub and in engaging contact therewith. At the same time the projected extremities of the teeth 20 and 24 which have a hook-like configuration will bite into the shaft-like portion 40 of the axle, functioning in similar fashion. As so applied, the teeth of the side edge portions of the plate segment will positively interconnect the wheel with the shaft. By reason of the form of the teeth on the plate segment and the truncated arrowhead-like configuration thereof, not only is an interconnection of the shaft-like portion with the hub made possible but there is established a relative position of the shaft-like portion to the hub of the wheel. Particular attention is directed to the FIG. 4 wherein it may be seen that the configuration of the plate segment, in the transverse sense, effected by the bow in the main body portion 18, produces a bridge-type triangular contact as between the inner surface of the hub and the shaft. The strength of the device 10 so applied should be readily apparent. Attention is directed to FIG. 6 of the drawings wherein it may be seen that three of the plate segments 10 may be equidistantly and circularly spaced about the shaft-like portion to give the shaft-like portion a firm, centered and balanced relation to the hub of the wheel to which it is integrally connected by the plate segments. Of course, it will be further self-evident that the tapered arrangement of the connecting portions of each plate segment and the arrangement of the teeth as they advance inwardly of the parts between which they are inserted to anchor thereto will be devoid of transverse sharp cutting edges in advance thereof, by virtue of which there is a smooth pressured flow of the material which the teeth encounter and this displaced material will flow over and to the rear of each tooth to produce a firm anchoring thereof. This obviates the problem of possible dislocation under stress and vibration in use of the wheel which might be occasioned if the teeth were formed to merely cut or gouge the inner surfaces of the wheel hub portion 31 and the shaft-like portion which it bounds.

It is contemplated that where the plate segment is integrated with a handle portion 30 as shown in FIG. 1 that this handle will not only facilitate the start of the plate segment between the wheel hub portion and the shaft-like portion which it bounds but may be used as a medium through which tapping of the plate segment may be effected to drive it in an axial sense and produce the press fit desired between the related parts.

It will be seen from the foregoing that an embodiment of the invention as here described may serve admirably to interconnect one part to another. It should be understood that the dimensions of the plate segment 10 can be of varying size. The device is so effective that in most embodiments it will appear in relatively miniature form and the incorporation of a handle 30 as described and illustrated will be highly advantageous in such case. In any case the device is a simple and inexpensive stamping in its preferred embodiment, being formed of very inexpensive sheet metal and being very inexpensive to fabricate.

It should be kept in mind that the device of FIGS. 1-6 is not only a connector device but a strong positioning device by reason of its configuration.

Attention is directed to the fact that this device may be utilized in some applications singly and used to provide a fit of a shaft-like portion of an object in an opening or hole, cavity or recess, which is oversized. Viewing FIG. 6, it may be seen that one can use appropriately sized plate segments 10 and center the shaft-like portion 40 in a fixed position in any oversized hole, such as may be provided by an oversized hub portion 31. By reason of the preferred configuration illustrated there will be a strong and balanced positioning of the shaft-like portion or axle and correspondingly a firm connection and balanced position for the interrelated wheel.

It is believed that the general application of the embodiment of FIGS. 1 through 6 is clearly evidenced from the description and drawings at hand and the application is no way to be construed as being limited to that described. Of course the device can be used to great advantage where the one end of the hub is counterbored or in the alternative the shaft-like portion bounded by the hub has a step. A shoulder is provided in each case against which the leading end of the plate segment 10 may seat, if so desired.

Reference is now made to the embodiment of the invention illustrated in FIGS. 7 through 12 of the drawings. As seen in FIG. 7, this embodiment comprises an element stamped from sheet metal in a forming operation providing a plate-like segment 50 having, with reference to its usual mode of application, a leading edge 52, a trailing edge 54 and identical side edge portions 56. In this case the side edge portions 56 have a generally triangular plate-like configuration the root lines or inner extremities of which are generally parallel and bound what may be considered the main body portion 58 of the segment 50, one end of which provides the leading edge 52 and the opposite end of which forms a part of the trailing edge 54. The main body portion 58 is bowed to form an arc in a transverse sense, which arc is formed on a uniform radius similar to the main body portion 18 of the segment 10. As thus provided, the main body portion 58 has one face or outer surface which has a convex configuration in a transverse sense and an opposite face or outer surface which has a concave configuration, each of which surfaces has the form of a longitudinal segment of a cylindrical surface. The side edge portions 56 of the segment 50 are co-planar and the surfaces thereof which bound the concave side of the main body portion 58 provide thereon co-planar flats 55, the purpose of which will be further described. The lateral extremities of the plate segment 50, in a transverse sense, diverge from the outermost edges of the flats 55 as seen in FIG. 8.

Formed in the outer edge surfaces of the side edge portions 56 are a series of teeth 60 which are longitudinally spaced and configured to give the plate segment 50, in plan view, the configuration of a truncated arrowhead. In this case the outer edge portions of the teeth 60 to each of the sides of the plate segment 50 are shaped to diverge from the ends thereof adjacent the leading edge 52. As thus provided, from the leading edge 52 to the trailing edge 54 of the plate segment 50 the teeth present a series of steps in the tapered side edges of the plate segment. The taper of the plate segment as defined by the toothed lateral extremities thereof is less than 10° in a preferred embodiment thereof. The relatively projected ends of the teeth 60 remote from the leading edge 52 of the plate segment are relatively skewed to angle from the leading to the trailing end of the plate segment. The arrangement is such that in application of the plate segment it will facilitate a pressured flow of material about these teeth and in a manner to anchor over the teeth and prevent accidental or inadvertent dislodgement of the plate segment from the parts to which it is applied.

In a stamping operation to fabricate a preferred embodiment of the invention per FIGS. 7 through 11 one of the plate segments 50 will be formed on each of the opposite ends of a handle 70, connected thereto by a relatively thinned and weakened plate portion 72.

A typical application for the embodiment of FIGS. 7-11 would be with reference to the application of a punch P in its retainer 64. Referring to FIGS. 8 and 9 of the drawings, it will be seen that the device 50 is being utilized in connection with a punch the head of which is provided with a flat 62 producing a step in its outer surface in the portion thereof which fits into the retainer 64. The opening for the punch in its retainer 64 is normally an aperture in which the flatted body portion of the punch is inserted with a light push or slip fit. Upon an insertion of the punch into the passage, aperture or hole in the retainer, the flat 62 will face a portion of the bounding wall structure which defines this hole. There is then inserted between the flat and the bounding wall structure, from the end of the punch constituting its head end a plate segment 50. The plate segment is applied so that flats 55 thereof will face the flat 62. The leading end of the plate segment is inserted first and as the device 50 is tapped inwardly between the flat 62 and its bounding wall structure, the teeth 60 will successively pressure material from the surface of the bounding wall structure in the path thereof to displace laterally. Due to the taper on the lateral edges of the plate segment 50 formed to include the teeth 60 and the skewed configuration of the trailing end portions of the teeth, a particular facility is provided to move material in the path of the teeth to displace therefrom and to overflow to the rear thereof once the teeth have passed. As seen in FIGS. 8 and 9, there is produced thereby a firm and positive anchoring of the teeth 60, that is the portions thereof which move interiorly of the surface of the wall structure bounding the flat 62, to preclude the inadvertent withdrawal or displacement of the plate segment. The net effect is that the teeth 60 generate burrs which nearly fill the voids produced between the trailing edge of each tooth and the leading edge of the following tooth. These is thus produced a locked position of the plate segment 50 in connection with the wall of the punch retainer which bounds the opening accommodating the flatted body portion of the punch P. At the same time the flats 55 determine a plane and abutment surface for the flat 62 on the punch. This will position the punch in a precisely required relation to the associated element or elements. One feature of this invention is that in effect the plate segment 50 once inserted and anchored to the retainer provides a plane of reference and accommodates a withdrawal of the punch from the wedged relation in which it is positioned by the plate segment and a replacement or reassembly thereof as and when required. The flats 55 will in any case provide a relatively permanent plane of reference for the positioning of any punch which is to be inserted in the retainer for a particular application.

Take particular note that the convex surface of the plate segment 50 is formed on an arc to conform or substantially conform to the arc produced by the radius of the opening in which the punch P is positioned for use thereof. Thus, there is a partial or full bearing of the convex portion on the wall bounding the flat 62 and there are transversely spaced flats 55 which bear against the flat of the punch and thereby insure a firm and positive location thereof.

Attention is directed to FIGS. 12 and 13 which reveal that both the convex and the concave surface portions of the main body portion 58 of the device 50 may be formed on radiuses which closely correspond on the one hand to the curve or radius of a contained shaft and on the other to the curve or radius of a bounding wall structure of a hole, cavity or recess in which a portion of the shaft is located. In such case, the device 58 may serve to provide a bearing for a shaft in an oversized hole. The application of the device 50 is as previously described, the only difference being that both the convex and the concave side surfaces of the main body portion of the plate segment will serve a useful bearing function, being complementary to the parts between which they position to permit rotation of one relative the other. The very small difference in the diameters of the plate segment 50 from the inner diameter of the hole and the outer diameter of the applied shaft provides additional tolerance of size control and the spring temper of the plate segment exerts enough force to provide bearing area in contact with both the wall defining the hole and the shaft up to full contact of both faces of the plate segment, one with the shaft and the other with the wall surface defining the hole.

The significance of the utilization of a modification of the device of FIG. 7 as just described in particularly evident when one considers how many times parts must be scrapped due to oversized holes. With devices in accordance with the invention available one can overcome the problem of oversized holes or mislocated holes in parts and salvage these parts for effective use thereof. As noted, one or more of the devices may be used to offset the position of a shaft in a hole or by the same token a plurality may be used to center a shaft in a hole.

While the invention has been particularly described with reference to dealing with the positioning or retention of elements having a shaft-like portion in a hole, cavity or recess, it should be understood that the peripheral and circumferential surface of the "shaft" or other element need not be round or precisely round.

The foregoing discloses only exemplary forms of embodiments and applications of the invention but it is felt that a mechanism versed in the art would certainly be able to see its wide range of application and various modification as comprehended by the nature and scope of the present invention.

It should be understood that the reference to a "hole" as used herein in an individual sense is meant to include a cavity, recess or the like and where the term "hole" is used in the claims it is to be construed as inclusive of the equivalent, that is a cavity, recess, etc.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Apparatus for insertion between adjacent facing surface portions of separate bodies to assist in establishing a required relationship of said bodies, comprising a device including a plate segment one end of which constitutes a leading end first inserted in the application thereof between adjacent facing surface portions of separate bodies and an opposite end of which constitutes a trailing end, said segment having its remote outer faces between said leading and trailing ends adapted for respective contact with the separate bodies between which said segment is applied, side edges of said segment which extend between said leading and trailing ends being each inclusive of portions which define a series of teeth constructed to produce in the application of said segment a pressured flow of material, in its path, of the surface of at least one of the separate bodies between which it is applied, at laterally spaced locations therein, in the course of its insertion between the separate bodies, said teeth including at least a portion thereof angularly related and inclined to another portion thereof in an arrangement to facilitate the movement of the pressured flow of material displaced by said teeth over, about and to lock over and behind said teeth, as the segment is applied in use thereof.

2. A device as in claim 1 wherein said teeth of each said series include a portion which projects in a sense outwardly of each of said remote faces in an arrangement providing that the teeth of each series are in immediately following relation and grouped to successively project outwardly from said remote faces in successively opposite directions.

3. A device as in claim 1 wherein said teeth are laterally of a body portion of said plate segment which extends in the direction of the leading and trailing ends of said segment and has an arcuate configuration in a sense transverse to the lateral extremities of said segment which are defined by said side edges thereof.

4. A device as in claim 1 in which said side edges are formed to produce a taper of said segment substantially from one end thereof to the other.

5. A device as in claim 1 wherein said plate segment is a section of sheet metal said side edges of which have a series of longitudinally spaced short cuts defining said teeth and said teeth are bent outwardly from the general configuration of said plate segment.

6. A device as in claim 5 wherein adjacent portions of said teeth are displaced, one relative the other.

7. A device as in claim 1 wherein said side edges define the lateral extremities of said plate segment and are tapered to provide a changing width to said plate segment which is a minimum at the one end thereof which constitutes its leading edge.

8. A device as in claim 7 wherein said segment is formed to have an arcuate cross-section intermediate said teeth, which lie at its lateral extremities.

9. A device as in claim 1 wherein one of said remote faces includes at least one flatted portion for bearing against a flat on one of the facing surface portions of the separate bodies between which said segment is applied and said teeth are constructed and arranged to project from the other of said remote faces.

10. A device as in claim 1 wherein, said plate segment is bowed in an area thereof intermediate its teeth at its respective side edges, portions of which define its lateral extremities producing therein a longitudinal extending concavity at one of said remote faces and a convex surface portion at the opposite face, said lateral extremities include flatted surface portions which bound the sides of said concavity and said teeth project relative that face of said plate segment which includes said convex surface portion.

11. A device as in claim 1 wherein said side edge portions bound a main body portion of said segment which is arcuately configured in a transverse sense and has the respectively remote faces thereof each formed in the configuration of a longitudinally extending section of a cylindrical surface.

12. A device as in claim 1 wherein said plate segment has the configuration of a truncated arrowhead.

13. A device as in claim 11 wherein said side edge portions provide flats to one face thereof adapted to serve as a reference plane and said teeth are formed to anchor to a facing wall surface in the application of said segment between adjacent surface portions of separate bodies.

14. A device as in claim 1 wherein said side edge portions are triangularly shaped and said tooth-like projections are formed by notches cut in the side of the triangular shape having the greatest dimension.

15. A device as set forth in claim 1 wherein said teeth are devoid of sharp cutting edges in advance thereof, having consideration for the direction of movement of said segment in its application.

16. A device as in claim 15 wherein said teeth define the remote lateral extremities of said segment and said lateral extremities are angularly related to the body portion of said segment which lies therebetween and extends from said leading to said trailing end of said segment.

17. Apparatus as in claim 1 wherein said teeth embodied in each of said side edges of said segment are successively angled in successively opposite directions with reference to the body portion of said segment which lies between said side edges and extends from the leading to the trailing ends thereof and each presents advance surface portions thereof, having regard to the direction of application of said segment, which are substantially devoid of sharp cutting edges, whereby to cause material in the path of movement of said teeth to pressure flow over, about and to substantially fill the voids between the teeth.

18. Apparatus as in claim 17 wherein said portions of said teeth include outer and inner portions which are angled one relative the other to facilitate their anchoring to one of the separate bodies between which said segment is applied in use thereof.

19. Apparatus for insertion between adjacent facing surface portions of separate bodies to assist in establishing a required relationship of said bodies, comprising a device including a plate segment one end of which constitutes a leading end first inserted in the application thereof between adjacent facing surface portions of separate bodies and an opposite end of which constitutes a trailing end, said segment having its remote outer faces between said leading and trailing ends adapted for respective contact with the separate bodies between which said segment is applied, said plate segment including tooth-like projections for anchoring thereof to at least one of the adjacent facing surface portions of separate bodies between which said segment is applied, said segment having an elongate plate-like extension at its trailing end, said segment being connected to said trailing end by a plate portion of reduced strength which affords a joint for breaking of said segment free from its extension and said elongate plate-like extension provides means through which a tapping force may be applied to insert said segment for use thereof.

20. A device for inserting between a shaft-like portion of an element and a bounding wall surface of a hole in a body receiving said shaft-like portion therein to assist in establishing a required relation of the element to the body in which the hole is formed, comprising a plate segment including oppositely directed remote faces adapted for contact respectively with said bounding wall surface and with said shaft-like portion upon insertion of said plate segment therebetween, said plate segment having with reference to its insertion between said bounding wall surface and said shaft a leading end, a trailing end and side edge portions bounding a main body portion which is arcuately configured in a transverse sense and has said remote faces thereon each in the configuration of a longitudinally extending section of a cylindrical surface, side edges of said segment being formed with relatively skewed tooth-like projections positioning longitudinally thereof, the lateral extremities of said plate segment defining said side edges being tapered and diverging from said leading end in the direction of said trailing end.

21. A device for inserting between a shaft-like portion of an element and a bounding wall surface of a hole in a body receiving said shaft-like portion therein to assist in establishing a required relation of the element to the body in which the hole is formed, comprising a plate segment including oppositely directed remote faces adapted for contact respectively with said bounding wall surface and with said shaft-like portion upon insertion of said plate segment therebetween, said plate segment having with reference to its insertion between said bounding wall surface and said shaft a leading end, a trailing end and side edge portions bounding a main body portion which is arcuately configured in a transverse sense and has said remote faces thereon each in the configuration of a longitudinally extending section of a cylindrical surface, said plate segment having tooth-like projections for anchoring thereof to at least one of the shaft-like portion and the wall surface of the body which bounds the hole and said plate segment being separably joined to a handle portion forming an axial extension of one end thereof and connected thereto by means defining a separable joint therebetween.

22. A device as in claim 21 wherein said axial extension of said plate segment is joined at one end thereof to said plate segment and has another one of said plate segments similarly joined to the opposite end thereof.

23. A device as in claim 22 wherein a plurality of said axial extensions with separable plate segments at opposite ends thereof are separably joined in a strip-like assembly from which one or more thereof may be readily separated.

24. A device for inserting between a shaft-like portion of an element and a bounding wall surface of a hole in a body receiving said shaft-like portion therein to assist in establishing a required relation of the element to the body in which the hole is formed, comprising a plate segment including oppositely directed remote faces adapted for contact respectively with said bounding wall surface and with said shaft-like portion upon insertion of said plate segment therebetween, one of said remote faces being configured to provide a bearing surface for a shaft-like portion of an element and the opposite of said remote faces including tooth-like projections at its lateral extremities to engage the bounding wall surface of a hole in a body receiving the shaft-like portion, providing that said plate segment may serve to establish required bearing surfaces to position a shaft-like portion of an object for rotation within an oversized hole and with reference to its bounding wall surface.

25. A device for insertion between a wheel and a shaft mounting the wheel, a portion of the shaft being accommodated in an opening in the wheel, to assist in fixing the required position of the wheel on the shaft, said device including a plate segment one end of which constitutes a leading end, having regard for its insertion between the shaft and the wheel, and an opposite end of which constitutes a trailing end, said segment having remote outer faces between its leading and trailing ends portions of which are adapted for contact, respectively, with the shaft and the wheel, said plate segment having tooth-like projections from each of the remote faces thereof which are embodied in connection with laterally extending portions of said segment, between said leading and trailing ends thereof, said tooth-like projections being formed to provide tapered sides for said segment and being constructed and arranged to effect a pressured displacement of oppositely facing surface portions of both the wheel and the shaft between which said segment is inserted and to cause the material displaced to wedge between the tooth-like projections, thereby to produce a lock as between said segment and the shaft and the wheel between which the segment is applied.

* * * * *

UNITED STATES PATENT AND TRADEMARK OFFICE
CERTIFICATE OF CORRECTION

PATENT NO. : 4,214,793
DATED : July 29, 1980
INVENTOR(S) : Robert J. Gargrave

It is certified that error appears in the above-identified patent and that said Letters Patent are hereby corrected as shown below:

Col. 7, line 12, "that" is corrected to read -- the --;

line 32, "These" is corrected to read -- There --.

Col. 8, line 15, "in" is corrected to read -- is -- line 33, "mechanism" is corrected to read -- mechanic --

Signed and Sealed this

Twenty-fifth Day of November 1980

[SEAL]

Attest:

SIDNEY A. DIAMOND

Attesting Officer

Commissioner of Patents and Trademarks